United States Patent [19]
Rim et al.

[11] Patent Number: 5,841,472
[45] Date of Patent: Nov. 24, 1998

[54] MPEG2 TRANSPORT DECODER

[75] Inventors: Chai Yeol Rim; Hyun Soo Lee, both of Seoul, Rep. of Korea

[73] Assignee: LG Electronics Inc., Seoul, Rep. of Korea

[21] Appl. No.: 559,634

[22] Filed: Nov. 20, 1995

[30] Foreign Application Priority Data

Nov. 23, 1994 [KR] Rep. of Korea .................. 1994 30875

[51] Int. Cl.⁶ ..................................................... H04N 7/24
[52] U.S. Cl. ........................... 348/390; 348/423; 348/845
[58] Field of Search .................................... 348/390, 384, 348/423, 845; H04N 7/24

[56] References Cited

U.S. PATENT DOCUMENTS

| | | | |
|---|---|---|---|
| 5,579,317 | 11/1996 | Pang | 348/423 |
| 5,619,337 | 4/1997 | Naimpally | 386/124 |
| 5,623,311 | 4/1997 | Phillips | 348/416 |

*Primary Examiner*—Howard Britton
*Attorney, Agent, or Firm*—John P. White; Cooper & Dunham LLP

[57] ABSTRACT

Disclosed is an MPEG2 transport decoder including a transport parser unit for storing each syntax field value by parsing, outputting each data identified with the packet identifier PID after collecting from each packet data and outputting the interrupt signal if a pointed resister value of the resist values is set; a CPU interface unit for providing an interface between the resister file of said transport parser unit and each decoder and outputting a signal selecting a transport parser unit or a video decoder, an audio decoder, a data decoder and a memory by decoding the address; a CPU for reading the interrupt resister from said CPU interface unit once an interrupt signal is inputted, detecting if the interrupt signal is inputted from said transport parser unit or from the video decoder, the audio decoder and the data decoder, and decoding according to the program on a memory unit; a memory unit for storing a program of the operations of said CPU; and a decoder interface unit for controlling in order to exchanging the data among said CPU, said transport parser unit and said video, audio, data decoders.

17 Claims, 21 Drawing Sheets

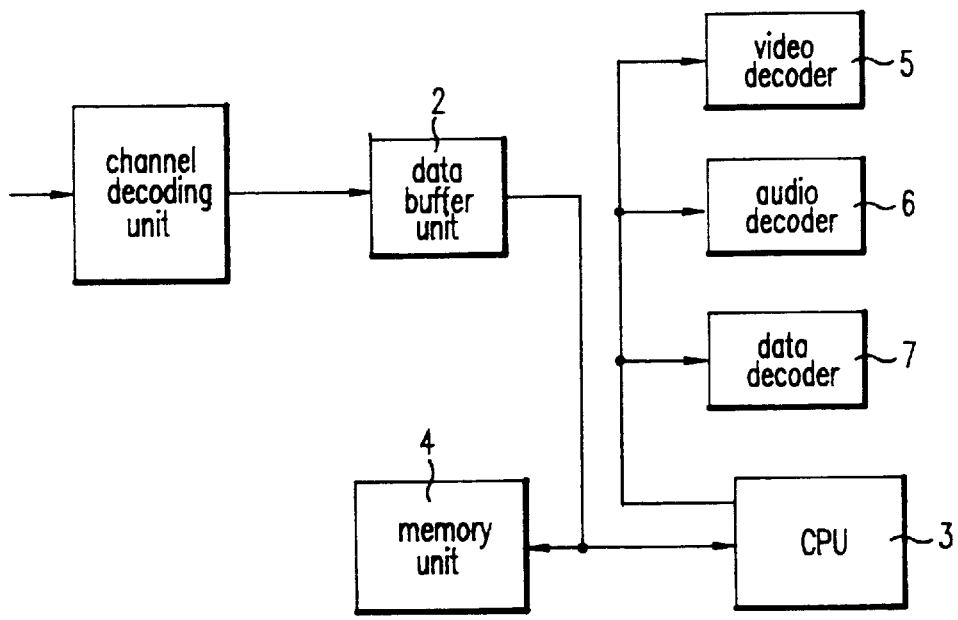
F.I G.1
prior art
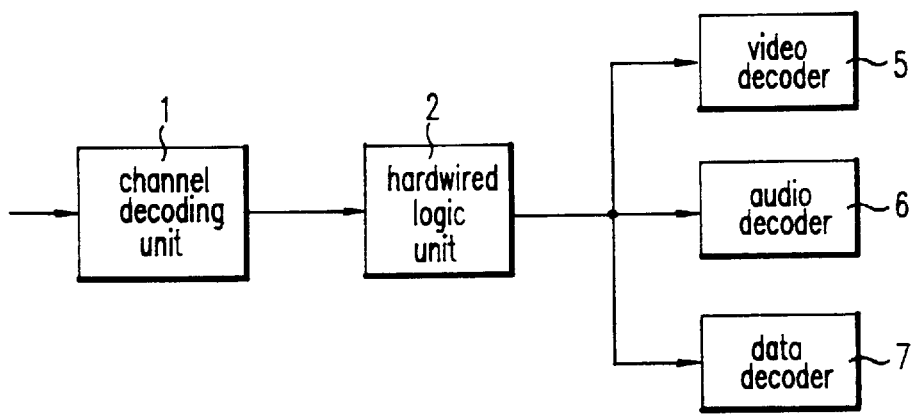
F.I G.2
prior art

FIG. 7

| Syntax | No. of bits | Mnemonic |
|---|---|---|
| transport_packet() { | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | uimsbf |
|   transport_scrambling_control | 2 | bslbf |
|   adaptation_field_control | 2 | bslbf |
|   continuity_counter | 4 | uimsbf |
|   if(adaptation_field_control='10' \|\| adaptation_field_control='11') { | | |
|     adaptation_field() | | |
|   } | | |
|   if(adaptation_field_control='01' \|\| adaptation_field_control='11') { | | |
|     for (i=0; i<N; i++) { | | |
|       data_byte | 8 | bslbf |
|     } | | |
|   } | | |
| } | | |

FIG. 8A

| Syntax | No. of bits | Mnemonic |
|---|---|---|
| adaptation_field() { | | |
|   adaptation_field_length | 8 | uimsbf |
|   if(adaptation_field_length>0) { | | |
|     discontinuity_indicator | 1 | bslbf |
|     random_access_indicator | 1 | bslbf |
|     elementary_stream_priority_indicator | 1 | bslbf |
|     PCR_flag | 1 | bslbf |
|     OPCR_flag | 1 | bslbf |
|     splicing_point_flag | 1 | bslbf |
|     transport_private_data_flag | 1 | bslbf |
|     adaptation_field_extension_flag | 1 | bslbf |
|     if(PCR_flag='1') { | | |
|       program_clock_reference_base | 33 | uimsbf |
|       reserved | 6 | bslbf |
|       program_clock_reference_extension | 9 | uimsbf |
|     } | | |
|     if(OPCR_flag='1') { | | |
|       original_program_clock_reference_base | 33 | uimsbf |
|       reserved | 6 | bslbf |
|       original_program_clock_reference_extension | 9 | uimsbf |
|     } | | |
|     if(splicing_point_flag='1') { | | |
|       splice_countdown | 8 | tcimsbf |
|     } | | |
|     if(transport_private_data_flag='1') { | | |
|       transport_private_data_length | 8 | uimsbf |
|       for (i=0; i<transport_private_data_length; i++) { | | |
|         private_data_byte | 8 | bslbf |
|       } | | |
|     } | | |
|     if(adaptation_field_extension_flag='1') { | | |
|       adaptation_field_extension_length | 8 | uimsbf |
|       ltw_flag | 1 | bslbf |
|       piecewise_rate_flag | 1 | bslbf |

FIG. 8B

| Syntax | No. of bits | Mnemonic |
|---|---|---|
| adaptation_extension_data { | | |
|   seamless_splice_flag | 1 | bslbf |
|   reserved | 5 | bslbf |
|   if(ltw_flag='1') { | | |
|     ltw_valid_flag | 1 | bslbf |
|     ltw_offset | 15 | uimsbf |
|   } | | |
|   if(piecewise_rate_flag='1') { | | |
|     reserved | 2 | bslbf |
|     piecewise_rate | 22 | uimsbf |
|   } | | |
|   if(seamless_splice_flag='1') { | | |
|     splice_type | 4 | bslbf |
|     DTS_next_au[32..30] | 3 | bslbf |
|     marker_bit | 1 | bslbf |
|     DTS_next_au[29..15] | 15 | bslbf |
|     marker_bit | 1 | bslbf |
|     DTS_next_au[14..0] | 15 | bslbf |
|     marker_bit | 1 | bslbf |
|   } | | |
|   for(i=0; i<N; i++) { | | |
|     reserved | 8 | bslbf |
|   } | | |
| } | | |
| for(i=0; i<N; i++) { | | |
|   stuffing_byte | 8 | bslbf |
| } | | |
| } | | |

FIG. 9A

| Syntax | No. of bits | Mnemonic |
|---|---|---|
| PES_packet(){ | | |
|     packet_start_code_prefix | 24 | bslbf |
|     stream_id | 8 | uimsbf |
|     PES_packet_length | 16 | uimsbf |
|     if(stream_id !=program_stream_map | | |
|     && stream_id !=padding_stream | | |
|     && stream_id !=private_stream_2 | | |
|     && stream_id !=ECM | | |
|     && stream_id !=EMM | | |
|     stream_id !=program_stream_directory){ | | |
|         '10' | 2 | bslbf |
|         PES_scrambling_control | 2 | bslbf |
|         PES_priority | 1 | bslbf |
|         data_alignment_indicator | 1 | bslbf |
|         copyright | 1 | bslbf |
|         original_or_copy | 1 | bslbf |
|         PTS_DTS_flags | 2 | bslbf |
|         ESCR_flag | 1 | bslbf |
|         ES_rate_flag | 1 | bslbf |
|         DSM_trick_mode_flag | 1 | bslbf |
|         additional_copy_info_flag | 1 | bslbf |
|         PES_CRC_flag | 1 | bslbf |
|         PES_extension_flag | 1 | bslbf |
|         PES_header_data_length | 8 | uimsbf |
|         if(PTS_DTS_flags='10'){ | | |
|             '0010' | 4 | bslbf |
|             PTS [32..30] | 3 | bslbf |
|             marker_bit | 1 | bslbf |
|             PTS [29..15] | 15 | bslbf |
|             marker_bit | 1 | bslbf |
|             PTS [14..0] | 15 | bslbf |
|             marker_bit | 1 | bslbf |
|         } | | |
|         if(PTS_DTS_flags='11'){ | | |
|             '0011' | 4 | bslbf |
|             PTS [32..30] | 3 | bslbf |
|             marker_bit | 1 | bslbf |
|             PTS [29..15] | 15 | bslbf |
|             marker_bit | 1 | bslbf |
|             PTS [14..0] | 15 | bslbf |
|             marker_bit | 1 | bslbf |
|             '0011' | 4 | bslbf |
|             DTS [32..30] | 3 | bslbf |
|             marker_bit | 1 | bslbf |
|             DTS [29..15] | 15 | bslbf |
|             marker_bit | 1 | bslbf |
|             DTS [14..0] | 15 | bslbf |
|             marker_bit | 1 | bslbf |
|         } | | |
|         if(ESCR_flag='1'){ | | |
|             reserved | 2 | bslbf |
|             ESCR_base [32..30] | 3 | bslbf |
|             marker_bit | 1 | bslbf |
|             ESCR_base [29..15] | 15 | bslbf |

FIG. 9B

| Syntax | No. of bits | Mnemonic |
|---|---|---|
| marker_bit | 1 | bslbf |
| ESCR_base [14..0] | 15 | bslbf |
| marker_bit | 1 | bslbf |
| ESCR_extension | 9 | uimsbf |
| marker_bit | 1 | bslbf |
| } | | |
| if(ES_rate_glag='1'){ | | |
| marker_bit | 1 | bslbf |
| ES_rate | 22 | uimsbf |
| marker_bit | 1 | bslbf |
| } | | |
| if(DSM_trick_mode_flag='1'){ | | |
| trick_mode_control | 3 | uimsbf |
| if(trick_mode_control='000'){ | | |
| field_id | 2 | bslbf |
| intra_slice_refresh | 1 | bslbf |
| frequency_truncation | 2 | bslbf |
| } | | |
| else if(trick_mode_control='001'){ | | |
| field_rep_cntrl | 5 | uimsbf |
| } | | |
| else if(trick_mode_control='010'){ | | |
| field_id | 2 | uimsbf |
| reserved | 3 | bslbf |
| } | | |
| else if(trick_mode_control='011'){ | | |
| field_id | 2 | bslbf |
| intra_slice_refresh | 1 | bslbf |
| frequency_truncation | 2 | bslbf |
| else if(trick_mode_control='100'){ | | |
| field_rep_cntrl | 5 | uimsbf |
| } | | |
| else | | |
| reserved | 5 | bslbf |
| } | | |
| if(additional_copy_info_flag='1'){ | | |
| marker_bit | 1 | bslbf |
| additional_copy_info | 7 | bslbf |
| } | | |
| if(PES_CRC_flag='1'){ | | |
| previous_PES_packet_CRC | 16 | bslbf |
| } | | |
| if(PES_extension_flag='1'){ | | |
| PES_private_data_flag | 1 | bslbf |
| pack_header_field_flag | 1 | bslbf |
| program_packet_sequence_counter_flag | 1 | bslbf |
| P-STD_buffer_flag | 1 | bslbf |
| reserved | 3 | bslbf |
| PES_extension_flag_2 | 1 | bslbf |
| if(PES_private_date_flag='1'){ | | |
| PES_private_data | 128 | bslbf |
| } | | |

(DSM_trick_mode_data brace encompasses the trick_mode_control block.)

FIG. 9C

| Syntax | | No. of bits | Mnemonic |
|---|---|---|---|
| PES_ extension_data | if(pack_header_field_flag='1'){ pack_field_length pack_header() } if(program_packet_sequence _counter_flag='1'){ marker_bit program_packet_sequence_ counter marker_bit MPEG1_MPEG2 identifier original_stuff_length } if(P-STD_buffer_flag='1'){ '01' P-STD_buffer_scale P-STD_buffer_size } if(PES_extension_flag_2='1'){ marker_bit PES_extension_field_length for (i=0; i<PES_extension_ field_length; i++){ reserved } } } for (i=0; i<N1; i++){ stuffing_byte } for (i=0; i<N2; i++){ PES_packet_data_byte } } else if(stream_id=program_stream_map ‖ stream_id=private_stream_2 ‖ stream_id=ECM ‖ stream_id=EMM stream_id=program_stream_directory){ for(i=0; i<PES_packet_length; i++){ PES_packet_data_byte } } else if(stream_id=padding_stream){ for(i=0; i<N3; i++){ padding_byte | 8<br><br><br><br><br>1<br>7<br><br>1<br>1<br>6<br><br><br>2<br>1<br>13<br><br><br>1<br>7<br><br><br>8<br><br><br><br>8<br><br><br>8<br><br><br><br><br><br><br>8<br><br><br>8 | uimsbf<br><br><br><br><br>bslbf<br>uimsbf<br><br>bslbf<br>bslbf<br>uimsbf<br><br><br>bslbf<br>bslbf<br>uimsbf<br><br><br>bslbf<br>uimsbf<br><br><br>bslbf<br><br><br><br>bslbf<br><br><br>bslbf<br><br><br><br><br><br><br>bslbf<br><br><br>bslbf |

FIG. 10A

| Syntax | No. of bits | Mnemonic |
|---|---|---|
| program_association_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   for (i=0; i<N; i++){ | | |
|     program_number | 16 | uimsbf |
|     reserved | 3 | bslbf |
|     if(program_number='0'){ | | |
|       network_PID | 13 | uimsbf |
|     } | | |
|     else{ | | |
|       program_map_PID | 13 | uimsbf |
|     } | | |
|   } | | |
|   CRC_32 | 32 | rpchof |
| } | | |

FIG. 10B

| Syntax | No. of bits | Mnemonic |
|---|---|---|
| TS_program_map_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i=0; i<N; i++){ | | |
|     descriptor() | | |
|   } | | |
|   for (i=0; i<P; i++){ | | |
|     stream_type | 8 | uimsbf |
|     reserved | 3 | bslbf |
|     elementary_PID | 13 | uimsnf |
|     reserved | 4 | bslbf |
|     ES_info_length | 12 | uimsbf |
|     for (i=0; i<Q; i++){ | | |
|       descriptor() | | |
|     } | | |
|   } | | |
|   CRC_32 | 32 | rpchof |
| } | | |

FIG. 10C

| Syntax | No. of bits | Mnemonic |
|---|---|---|
| CA_section(){ | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   reserved | 18 | bslbf |
|   version_number | 5 | uimsbf |
|   current_next_indicator | 1 | bslbf |
|   section_number | 8 | uimsbf |
|   last_section_number | 8 | uimsbf |
|   for (i=0; i<N; i++){ | | |
|     descriptor() | | |
|   } | | |
|   CRC_32 | 32 | rpchof |
| } | | |

FIG. 11

| Register Name | No. of Bits |
|---|---|
| transport_error_indicator | 1 |
| payload_unit_start_indicator | 1 |
| transport_priority | 1 |
| PID | 13 |
| PID_V | 13 |
| PID_A | 13 |
| PID_D | 13 |
| PID_PAT | 13 |
| PID_PMT | 13 |
| PID_CAT | 13 |
| PID_NIT | 13 |
| PID_V_flag | 1 |
| PID_A_flag | 1 |
| PID_D_flag | 1 |
| PID_PAT_flag | 1 |
| PID_PMT_flag | 1 |
| PID_CAT_flag | 1 |
| PID_NIT_flag | 1 |
| transport_scrambling_control | 2 |
| adaption_field_control | 2 |
| continuity_counter | 4 |
| continuity_counter_error_flag | 1 |
| tp_int_reg | 11 |
| tp_int_en | 11 |
| data_register | 8 |

FIG. 12

| register name | No. of bits |
|---|---|
| PES_scrambling_control | 2 |
| PES_priority | 2 |
| data_alignment_indicator | 1 |
| copyright | 1 |
| original_or_copy | 1 |
| PTS_DTS_flags | 2 |
| ESCR_flag | 1 |
| DSM_trick_mode_flag | 1 |
| aditional_copy_info_flag | 1 |
| PES_extension_flag | 1 |
| PTS | 33 |
| DTS | 33 |
| ESCR_base | 33 |
| ESCR_extension | 9 |
| ES_rate | 22 |
| pes_int_reg | 12 |
| pes_int_en | 12 |
| data_register | 8 |

FIG. 13

| register name | No. of bits |
|---|---|
| discontinuity_indicator | 1 |
| random_access_indicator | 1 |
| elementary_stream_priority_indicator | 1 |
| PCR_flag | |
| OPCR_flag | 1 |
| splicing_point_flag | 1 |
| transport_private_data_flag | 1 |
| adaption_field_extension_flag | 1 |
| program_clock_reference_base | 33 |
| program_clock_reference_extension | 9 |
| original_program_clock_reference_base | 33 |
| original_program_clock_reference_extension | 9 |
| spice_countdown | 8 |
| adf_int_reg | 8 |
| adf_int_en | 8 |
| data_register | 8 |

FIG. 14

```
tp_int_reg(0) ⇐ transport_error_indicator & tp_int_en(0);
tp_int_reg(1) ⇐ payload-unit-start-indicator & tp_int_en(1);
tp_int_reg(2) ⇐ transport_priority & tp_int_en(2);
tp_int_reg(3) ⇐ PID_V_flag & tp_int_en(3);
tp_int_reg(4) ⇐ PID_A_flag & tp_int_en(4);
tp_int_reg(5) ⇐ PID_D_flag & tp_int_en(5);
tp_int_reg(6) ⇐ PID_PAT-flag & tp_int_en(6);
tp_int_reg(7) ⇐ PID_PMT-flag & tp_int_en(7);
tp_int_reg(8) ⇐ PID_CAT_flag & tp_int_en(8);
tp_int_reg(9) ⇐ PID_NIT_flag & tp_int_en(9);
tp_int_reg(10) ⇐ (transport_scambling_control(0) &
                  transport_scambling_control(1)) & tp_int_en(10);

tp_int ⇐ tp_int_reg(0)#tp_int_reg(1)#tp_int_reg(2)#
         tp_int_reg(3)#tp_int_reg(4)#tp_int_reg(5)#
         tp_int_reg(6)#tp_int_reg(7)#tp_int_reg(8)#
         tp_int_reg(9)#tp_int_reg(10);
```

FIG. 15

```
adf_int_reg(0) ⇐ discontinuity_indicator & adf_int_en(0);

adf_int_reg(1) ⇐ random_access_indicator & adf_int_en(1);

adf_int_reg(2) ⇐ elementary_stream_priority_indicator & adf_int_en(2);

adf_int_reg(3) ⇐ PCR_flag & adf_int_en(3);

adf_int_reg(4) ⇐ OPCR_flag & adf_int_en(4);

adf_int_reg(5) ⇐ splice_point_flag & adf_int_en(5);

adf_int_reg(6) ⇐ transport_private_data_flag & adf_int_en(6);

adf_int_reg(7) ⇐ adaptation_field_extension_flag & _adf_int_en(7);

adf_int ⇐ adf_int_reg(0)#adf_int_reg(1)#adf_int_reg(2)#
           adf_int_reg(3)#adf_int_reg(4)#adf_int_reg(5)#
           adf_int_reg(6)#adf_int_reg(7);
```

FIG. 16

```
pes_int_reg(0) ⇐ (PES_scambling_control(0) #
                   PES_scambling_control(1)) & pes_int_en(0);

pes_int_reg(1) ⇐ PES_priority & pes_int_en(1);

pes_int_reg(2) ⇐ data_alignment_indicator & pes_int_en(2);

pes_int_reg(3) ⇐ copyright & pes_int_en(3);

pes_int_reg(4) ⇐ original_or_copy & pes_int_en(4);

pes_int_reg(5) ⇐ PTS_DTS_flags(1) & !PTS_DTS_flags(0) & pes_int_en(5);

pes_int_reg(6) ⇐ PTS_DTS_flags(1) & PTS_DTS_flags(0) & pes_int_en(6);

pes_int_reg(7) ⇐ ESCR_flag_ & pes_int_en(7);

pes_int_reg(8) ⇐ DSM_trick_mode_flag & pes_int_en(8);

pes_int_reg(9) ⇐ additional_copy_infor_flag & pes_int_en(9);

pes_int_reg(10)⇐PES_CRC_flag & pes_int_en(10);

pes_int_reg(11)⇐PES_extension_flag & pes_int_en(11);

pes_int ⇐ pes_int_reg(0)#pes_int_reg(1)# pes_int_reg(2)#
             pes_int_reg(3)#pes_int_reg(4)# pes_int_reg(5)#
             pes_int_reg(6)#pes_int_reg(7)# pes_int_reg(8)#
             pes_int_reg(9)#pes_int_reg(10)# pes_int_reg(11);
```

FIG. 17

```
int_reg(0) <= tp_int & int_en(0);

int_reg(1) <= adf_int & int_en(1);

int_reg(2) <= pes_int & int_en(2);

int_reg(3) <= vid_int & int_en(3);

int_reg(4) <= aud_int & int_en(4);

int_reg(5) <= data_int & int_en(5);

int_cpu   <= int_reg(0)#int_reg(1)# int reg(2)
             int_reg(3)#int_reg(4)# int reg(5);
```

MPEG2 TRANSPORT DECODER

BACKGROUND OF THE INVENTION

The present invention relates to an MPEG2 transport decoder, more particularly to an MPEG2 transport decoder which is programmable for multipurpose use.

Recently, as for a format for transmitting/receiving a digitally processed picture and an audio between media, a number of methods are suggested. Among them, there is an MPEG2 system part suggested from the moving picture experts group MPEG2 so that the data can be transmitted and received between media with being made as a format convenient for using the compressed picture and sound data. The transmitting/receiving format is divided into two types: one is to transmit/receive in an error free environment as of a medium of storing device; the other is to transmit/receive in an environment in which an error may be occurred as of a medium of a satellite or a cable. The transmitting/receiving in an environment in which an error never occurs is performed by formatting such manner of a program stream and in an environment in which an error may often occur is performed by formatting such manner of a transport packet stream.

A typical MPEG2 transport decoder applied in a transmitting/receiving device in an error having environment is divided into the cases of using a central processor unit CPU and using a hardwired logic.

In the MPEG2 transport decoder using the CPU, the operation of the CPU should be performed at a high speed and in the MPEG2 transport decoder using the hardwired logic, the use should be fixed in a certain purpose.

Referring to the attached drawings, conventional construction of the MPEG2 transport decoder is described below.

FIG. 1 illustrates the MPEG2 transport decoder using a conventional CPU. FIG. 2 illustrates the MPEG2 transport decoder using a conventional hardwired logic. The MPEG2 transport decoder using a conventional CPU as illustrated in FIG. 1, comprises a channel decoding unit 1 outputting a transport packet data by tuning and demodulating a signal received through a satellite or a cable, a data buffer unit 2 outputting after storing momentarily a transport packet data outputted from the channel decoding unit 1; a CPU 3 performing a decoding operation as programmed in the memory by reading a data outputted from the data buffer unit 2; a memory unit 4 storing a program to be operated by the CPU 3; and three decoders of a video decoder 5, an audio decoder 6, and a data decoder 7 decoding a video signal, an audio signal and a data signal each with the CPU 3. On the other hand, the MPEG2 transport decoder using a conventional CPU as illustrated in FIG. 2, comprises a channel decoding unit 1 outputting a transport packet data by tuning and demodulating a signal received through a satellite or a cable, a hardwired logic unit 8 decoding a transport packet data outputted from the channel decoding unit 1 in such a manner of hardwiring; and three decoders of a video decoder 5, an audio decoder 6, and a data decoder 7 decoding a video signal, an audio signal and a data signal each with the hardwired logic unit.

As described above, the conventional transport decoding is performed only with the CPU or the hardwired logic. That is, as of FIG. 1, as CPU is used for encompassing all various applications, the CPU reads a transport packet data from the channel decoder unit 1, performs a decoding operation according to the program on the memory unit 4 and outputs the decoded data to a video, an audio, and a data decoder.

However, with these systems in which the data is processed by programming, a high-speed CPU is needed to perform a high-speed decoding operation. And as illustrated in FIG. 2, in case of composing with a hardwired logic, a decoding operation is possible in the fixed applications, however in case of different applications, the decoding operation is not flexible. In addition, when using an unfixed field or a private data is inputted thereto, if the related condition is not composed of hardwired logic, a hardwired logic circuit should be recomposed to process the case.

SUMMARY OF THE INVENTION

The object of the present invention is to solve the problems of prior art, so that the transport decoding operation may be variously applied according to the programmed contents by user by composing the MPEG2 transport decoder with incorporating a hardwired logic and a CPU capable of being programmed.

The characteristic of the invention to achieve the object is that the MPEG2 transport decoder is comprised of a transport parser unit storing each syntax field value by parsing, outputting each data identified with the packet identifier PID after collecting from each packet data and outputting the interrupt signal if a pointed register value of the resist values is set, a CPU interface unit providing an interface between the register file of the transport parser unit and each decoder and outputting a signal selecting a transport parser unit or a video decoder, an audio decoder, a data decoder and a memory by decoding the address, a CPU reading the interrupt register from the CPU interface unit once an interrupt signal is inputted, detecting if the interrupt signal is inputted from the transport parser unit or from a video decoder, the audio decoder and the data decoder, and decoding according to the program on a memory unit, a memory unit storing a program of the operations of CPU, and a decoder interface unit controlling in order to exchange the data among the CPU, the transport parser unit, and the video, audio, data decoders.

BRIEF DESCRIPTION OF THE DRAWINGS

FIG. 1 is a configuration view of an MPEG2 transport decoder using a conventional CPU;

FIG. 2 is a configuration view of an MPEG2 transport decoder using a conventional hardwired logic;

FIG. 7 illustrates a transport packet syntax inputted to a transport packet decoder register according to a preferred embodiment of the invention;

FIGS. 8a and 8b illustrate a ADF syntax inputted to a ADF decoder register according to a preferred embodiment of the invention;

FIGS. 9a–9c illustrate a PES packet syntax inputted to a PES decoder register according to a preferred embodiment of the invention;

FIGS. 10A, 10B and 10C illustrate a PSI syntax inputted to a PSI decoder register according to a preferred embodiment of the invention;

FIG. 11 illustrates a register list of the transport decoder according to a preferred embodiment of the invention;

FIG. 12 illustrates a register list of a ADF decoder according to a preferred embodiment of the invention;

FIG. 13 illustrates a register list of a PES decoder according to a preferred embodiment of the invention;

FIG. 14 illustrates a table of interrupt generation in a transport decoder according to a preferred embodiment of the invention;

FIG. 15 illustrates a table of interrupt generation in a ADF decoder according to a preferred embodiment of the invention;

FIG. 16 illustrates a table of interrupt generation in a PES decoder according to a preferred embodiment of the invention; and FIG. 17 illustrates a table of interrupt generation in a CPU controlling interface unit according to a preferred embodiment of the invention.

DETAILED DESCRIPTION OF THE PREFERRED EMBODIMENTS

An MPEG2 transport decoder of the present invention is now be described with reference to the attached drawings.

Figure 3:
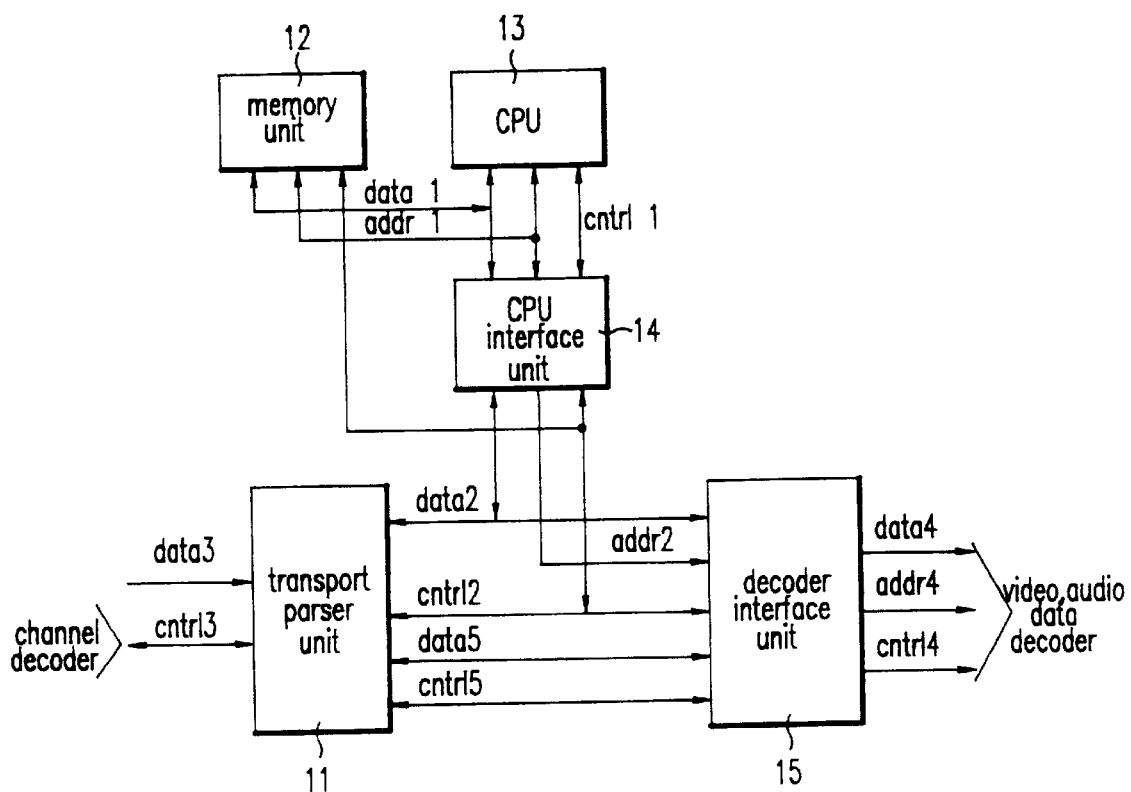
FIG. 3 is a configuration view of an MPEG2 transport decoder capable of being programmed according to the invention.

As illustrated in FIG. 3, An MPEG2 transport decoder of the invention according to the regulations of the MPEG2 system comprises a transport parser unit 11 storing each syntax field value after parsing, outputting each audio, video and data information which is set of PID after collecting from each packet data inputted from the channel and outputting the interrupt signal if an identified register value of the register values is set, a CPU interface unit 14 providing an interface between the register file of the transport parser unit 11 and each decoder, and outputting a signal selecting a transport parser unit 11 or a video decoder, an audio decoder, a data decoder and a memory by decoding the address, a CPU 13 reading the interrupt register from the CPU interface unit once an interrupt signal is inputted, detecting if the interrupt signal is inputted from the transport parser unit 11 or from a video decoder, the audio decoder and the data decoder, and decoding according to the program on a first memory unit 12, the first memory unit 12 storing a program of the operations of CPU 13, and a decoder interface unit 15 controlling in order to exchange the data among the CPU 13, the transport parser unit 11, and the video, audio, data decoders.

The figures which is not described in FIG. 3 is provided as follows.

A data1 is a data bus of CPU 13, an addr1 is an address bus of CPU, and a cntrl1 is a controlling signal of CPU and is composed of a READ/WRITE signal, a STROBE signal, a READY signal and an interrupt signal.

A data2 is a data bus, a cntrl2 is composed of the selecting signal to identify the resisters of the transport parser unit 11, read the value with the data bus 2 or to write the value of the data 2 bus, a selecting signal to read and write the audio, video and other decoders, a strobe signal and a ready signal.

A data3 is a data bus inputted from the channel decoder and a cntrl3 is composed of a Read Enable signal to read the data from the channel decoder, Read Clock, and a Ready signal.

A data4 is composed of the video, audio and data buses to input/output to the video, audio and data decoders, an addr4 is composed of an address bus of the video, audio and data addresses to output to the video, audio and data decoders, and a cntrl4 is composed of a controlling signal to read/write of the video, audio and data decoders.

A data5 is a data bus transmitting the data between the transport parser unit 11 and the decoder interface unit 15, a cntrl5 is a controlling signal bus transmitting the controlling signal between the PES decoder 24 of the transport parser unit 11 and the decoder interface unit 15.

Thus-composed MPEG2 transport decoder of the invention is now described more in detail as follows.

Figure 4:
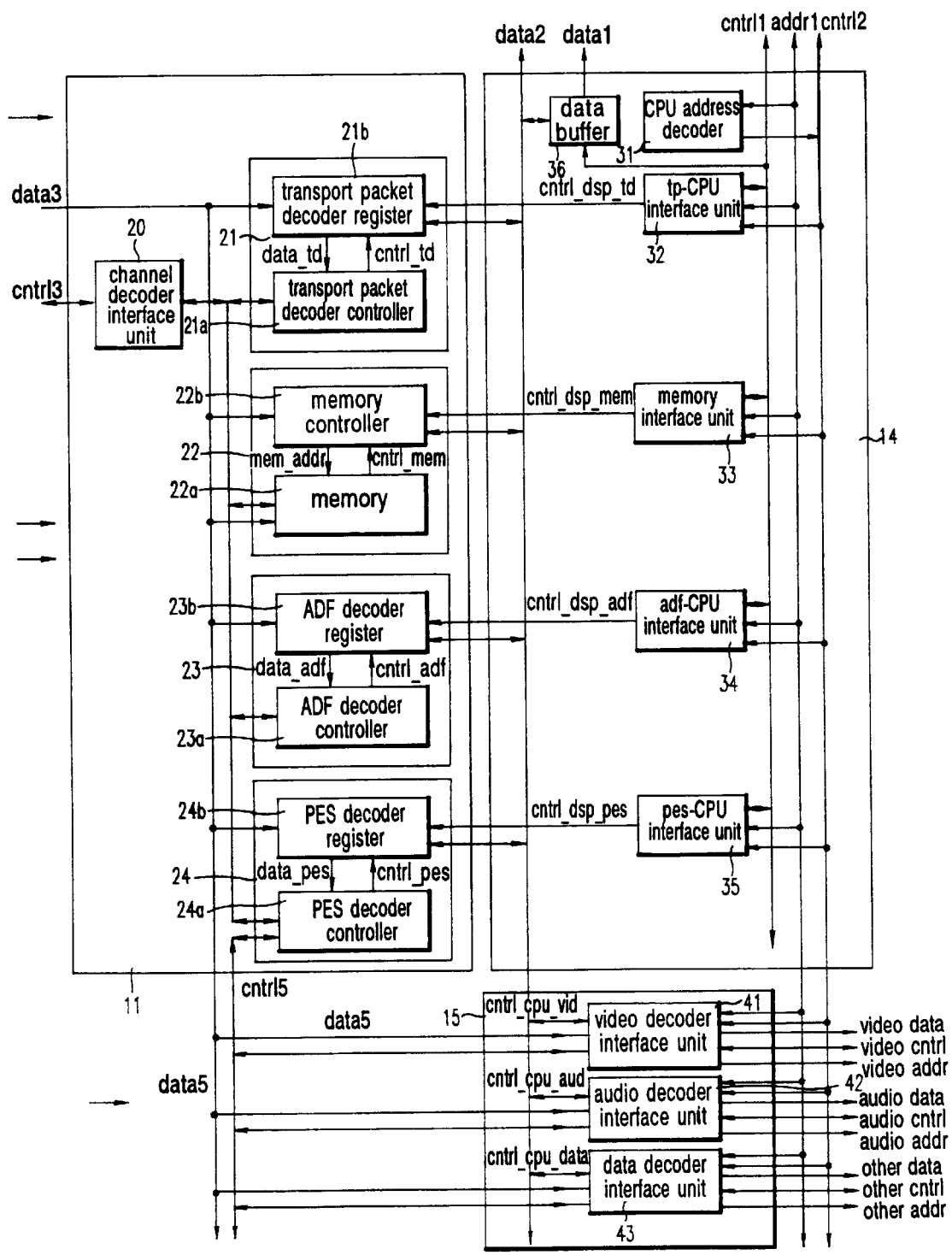
FIG. 4 is a detailed block diagram of a transport parser unit and a CPU interface unit of FIG. 3.

In FIG. 4, the transport parser unit 11 is comprised of a channel decoder interface unit 20, a transport decoder 21, a second memory unit 22, an adaptation field ADF decoder 23 and a packetized elementary stream PES decoder 24. That is, the channel decoder interface unit 20 is an interface for inputting/outputting the data and the controlling signal with the channel decoder unit 1 in the transport parser unit 11. The transport decoder 21 is comprised of a transport packet decoder controller 21a for parsing the MPEG2 transport packet syntax and a transport packet decoder register 21b for storing each header field value parsed in the transport packet decoder controller 21a. The registers in the transport decoder register 21b are accessed by the CPU 13 and the parsed field value is interrupted according to the enabling state of the interrupt register to the CPU 13.

The-second memory unit 22 is comprised of a memory 22a for storing the PSI sections of the MPEG2 streams, and the adaptation_extension_data and the transport_private_data shown in FIG. 8 and the PES_extension_data and the DSM_trick_mode_data shown in FIG. 9 contained in the selected packet, and a memory controller 22b for producing storage addresses mem_addr at which those data to be stored using information on memory address indicating storage positions of those data and producing cntrl_mm to control memory access. The memory 22a may include a DRAM or an SRAM, and the memory controller 22b has start addresses and end addresses required for storing each PSI section and four kinds of data in the memory 22a and a write address for writing. The CPU 13 may designate the start addresses and the end addresses, and the write address serves to store the data started from the start addresses to the end addresses increasing the addresses automatically.

The ADF decoder 23 is comprised of an ADF decoder controller 23a for parsing the ADF data of the MPEG2 transport packet syntaxes and an ADF decoder register 23b for storing each field value of the parsed header in the ADF decoder controller 23a. The registers in the ADF decoder registers 23b are accessed by CPU 13 and the parsed field value is interrupted according to the enabling state of the interrupt register to the CPU 13.

The PES decoder 24 is comprised of a PES decoder controller 24a for parsing the PES section of the MPEG2 streams and a PES decoder register 24b for storing each field value of the parsed header. The registers in the PES decoder registers 24b are accessed by CPU 13 and the parsed field value is interrupted according to the enabling state of the interrupt register to the CPU 13.

On the other hand, the CPU interface unit 14 is comprised of a data buffer 26, a CPU address decoder 31, a tp-CPU interface unit 32, a memory interface unit 33, an adf-CPU interface unit 34 and a pes-CPU interface unit 35. Namely, the data buffer 36 performs a buffering to read/write the contents of the CPU data bus. The CPU address decoder 31 generates a selecting signal for selecting a register of the transport parser unit 21 by decoding the high address part of the CPU 13, a selecting signal for accessing the video, audio and other decoders and a selecting signal for accessing the program/data memory. The tp-CPU 32 generates a controlling signal cntrl-dsp-td for the CPU 13 to access the register in the transport packet decoder register 21b by incorporating a controlling signal cntrl1 of the CPU 13, an address signal addr1 and a selecting signal, and decodes each address for each register to have other addresses. The memory interface unit 33 generates a controlling signal cntrl-dsp-mem for the CPU 13 to access the register in the memory controller 22b by incorporating a controlling signal cntrl1 of the CPU 13, an address signal addr1 and a selecting signal, and decodes each address for each register to have other addresses. The adf-CPU interface unit 34 generates a controlling signal cntrl-dsp-adf for the CPU 13 to access the register in the ADF decoder register 23b by incorporating a controlling signal cntrl1 of the CPU 13, an address signal addr1 and a selecting signal, and decodes each address for each register to have other addresses. The pes-CPU interface unit 35 generates a controlling signal cntrl-dsp-pes for the CPU 13 to access the register in the PES decoder register 24b by incorporating a controlling signal cntrl1 of the CPU 13, an address signal addr1 and a selecting signal, and decodes each address for each register to have other addresses.

The decoder interface unit 15 is comprised of a video decoder interface unit 41, an audio decoder interface unit 42 and a data decoder interface unit 43.

The video decoder interface unit 41 controls an address bus, a data bus and a controlling signal for the CPU 13 and the PES decoder 24 to access the video decoder jointly. In other words, the video decoder interface unit 41 receives an address bus signal addr1, a data bus signal data2 and a video decoder selecting signal from the CPU 13 and inputs or outputs the video address, the video data and controlling signals, thereby accessing the video decoder by the CPU 13. And after storing momentarily the data signal data5 and the controlling signal control5 from the PES decoder 24, the video decoder interface unit 41 outputs the video data, the video control and the video address to the video decoder 5 while the CPU 13 does not access the video decoder 5.

The audio decoder interface unit 42 controls an address bus, a data bus and a controlling signal for the CPU 13 and the PES decoder 24 to access the audio decoder jointly. In other words, the audio decoder interface unit 42 receives an address bus signal addr1, a data bus signal data2 and a audio decoder selecting signal from the CPU 13 and inputs or outputs the audio address, the audio data and controlling signals, thereby accessing the audio decoder 6 by the CPU 13. And after storing momentarily the data signal data5 and the controlling signal control5 from the PES decoder 24, the audio decoder interface unit 42 outputs the audio data, the audio control and the audio address to the audio decoder 6 while the CPU 13 does not access the audio decoder 6.

The data decoder interface unit 43 controls an address bus, a data bus and a controlling signal for the CPU 13 and the PES decoder 24 to access the data decoder jointly. In other words, the data decoder interface unit 43 receives an address bus signal addr1, a data bus signal data2 and a data decoder selecting signal from the CPU 13 and inputs or outputs the data address, the data and controlling signals, thereby accessing the data decoder 7 by the CPU 13. And after storing momentarily the data signal data5 and the controlling signal control5 from the PES decoder 24, the data decoder interface unit 43 outputs the data, the data control and the data address to the data decoder 7 while the CPU 13 does not access the data decoder 7.

Figure 5:
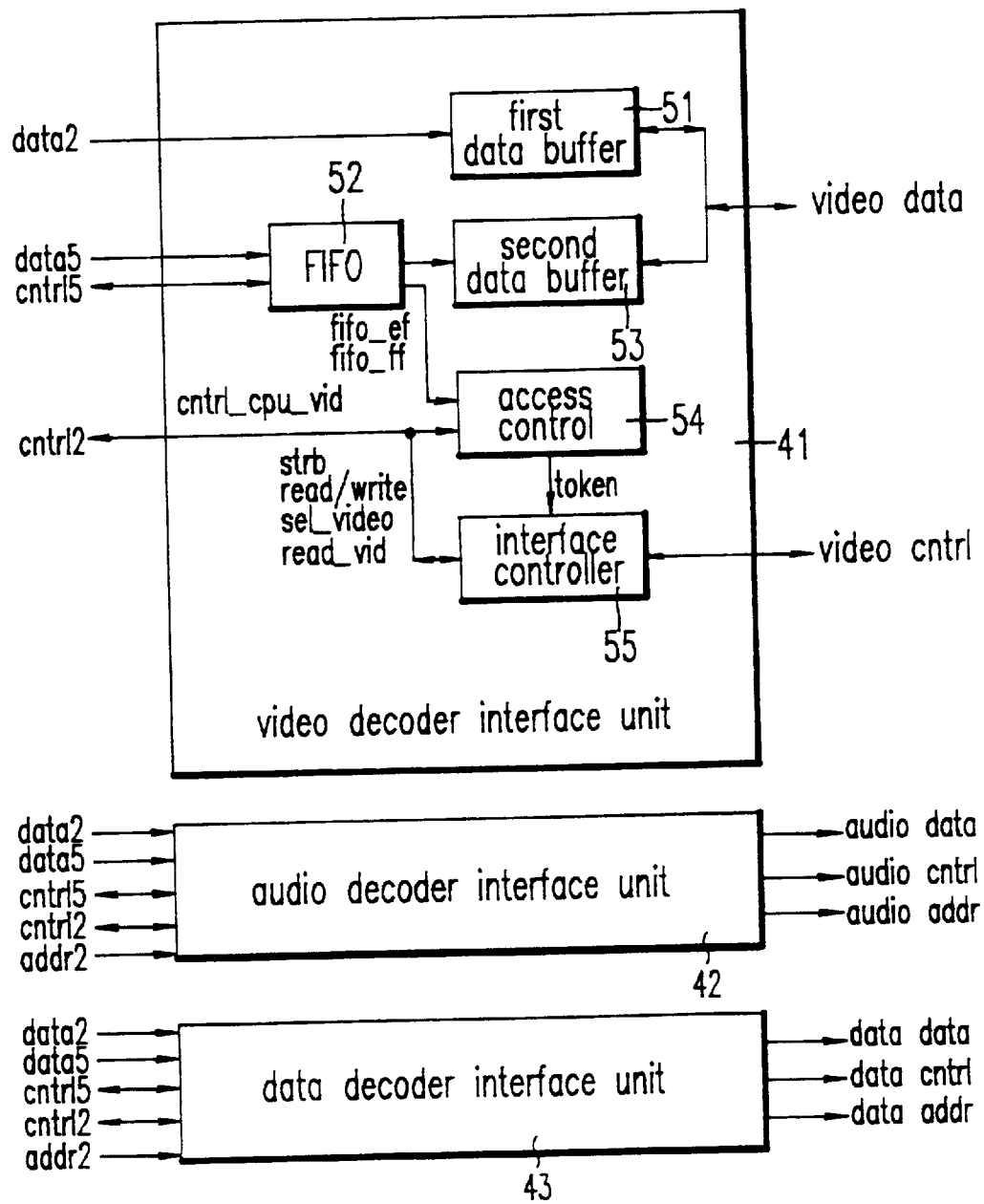
FIG. 5 is a detailed block diagram of an embodiment of a decoder interface unit of FIG. 4.

On the other hand, the decoder interface unit 15 illustrated in FIG. 4 is comprised of the video decoder interface unit 41, the audio decoder interface unit 42 and the data decoder interface unit 43 and each decoder interface unit 41, 42 and 43 has the same configuration as of FIG. 5, however need not be composed all at once and may be partially composed according to the application.

Therefore in FIG. 5 only the video decoder interface unit 41 is illustrated. That is, the video decoder interface unit 41 comprises a first data buffer 51 outputting after storing momentarily the data outputted from the CPU 13, a FIFO 52 storing momentarily the data outputted from the transport parser unit 11 and then outputting firstly the data inputted before, simultaneously with outputting the signals fifo-ef and fifo-ff indicating if the data is filled out or not, a second data buffer 53 outputting the data outputted from the FIFO 52 after storing momentarily, an access controlling unit 54 setting the signal token giving right of an access to the CPU 13 according to the accessing condition of the video decoder 5 by the outputting signals fifo-ef and fifo-ff of the FIFO 52 and the CPU 13, and an interface controlling unit 55 finishing the present accessing work with the signal token from the access controlling unit 54 and controlling for the CPU 13 to access to read/write the video decoder.

Figure 6:
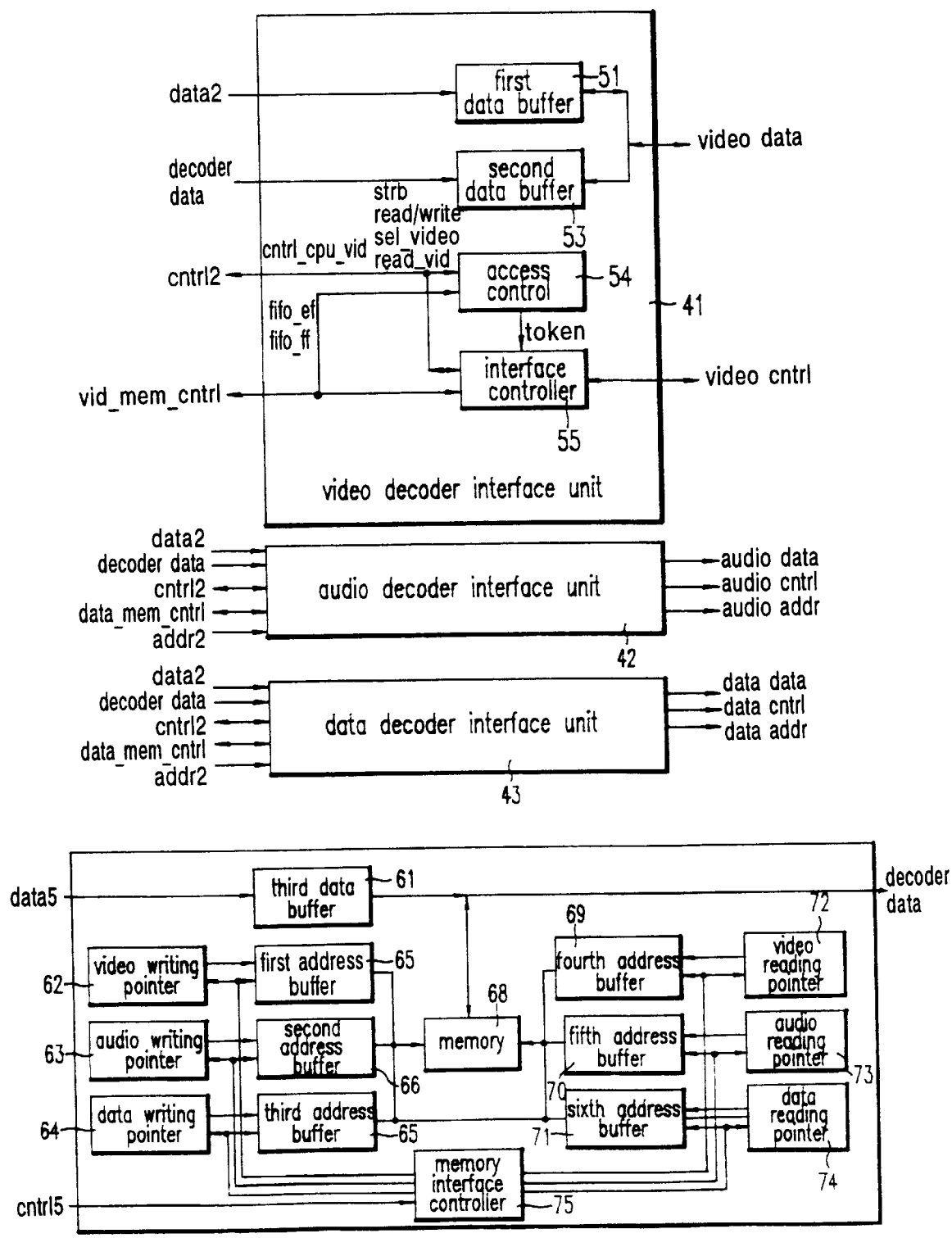
FIG. 6 is a detailed block diagram of another embodiment of a decoder interface unit of FIG. 4.

FIG. 6 is a detailed block diagram of another embodiment of the decoder interface unit of FIG. 4.

In an embodiment of FIG. 5, a FIFO is installed in each video, audio and data decoder interface unit 41, 42 and 43 and the FIFO is installed in common in other embodiment of FIG. 6.

That is, it is comprised of a first data buffer 51 outputting after storing momentarily the data outputted from the CPU 13 to the video decoder interface unit 41, the audio decoder interface unit 42 and the data decoder interface unit 43, a second data buffer 53 outputting the decoder data after storing momentarily, an access controlling unit 54 setting the signal token giving right of an access to the CPU 13 according to the accessing condition of the video decoder 5 with the signals fifo-ef and fifo-ff outputted through a controlling signal line vid-mem-cntrl and the CPU 13, and an interface controlling unit 55 finishing the present accessing work with the signal token from the access controlling unit 54 and controlling for the CPU 13 to access to read/ write the video decoder. And the common memory unit 44 is installed in the video decoder interface unit 41, the audio decoder interface unit 42 and the data decoder interface unit 43. Namely, the memory unit 44 comprises a third data buffer 61 storing the output data of the transport parser unit 11 momentarily, a memory 68 divided into three areas of video, audio and data storing areas and storing the data inputted from the third data buffer 61 or outputting the stored data into the decoder data, a video writing pointer 62 outputting a writing address in order to write the video data to the memory 68, an audio writing pointer 63 outputting a writing address in order to write the audio data to the memory 68, a data writing pointer 64 outputting a writing address in order to write the data to the memory 68, a first address buffer 65 storing momentarily the address outputted from the video writing pointer 62, a second address buffer 66 storing momentarily the address outputted from the audio writing pointer 63, a third address buffer 67 storing momentarily the address outputted from the data writing pointer 64, a video reading pointer 72 outputting a reading address in order to read the video data to the memory 68, an audio reading pointer 73 outputting a reading address in order to read the audio data to the memory 68, a data reading pointer 74 outputting a reading address in order to read the data to the memory 68, a fourth address buffer 69 storing momentarily the address outputted from the video reading pointer 72, a fifth address buffer 70 storing momentarily the address outputted from the audio reading pointer 73, a sixth address buffer 71 storing momentarily the address outputted from the data reading pointer 74, and a memory interface controller 75 controlling the operations of the pointers 62, 63, 64, 72, 73 and 74 and the address buffers 65, 66, 67, 69, 70 and 71 by the controlling signal cntrl5 from the PES decoder 24.

An operation of the invention composed as described above is as follows.

FIG. 7 illustrates a transport packet syntax inputted to a transport packet decoder register 21b of the invention; FIGS. 8A and 8B illustrate the ADF syntax inputted to a ADF decoder register 23b of the invention; FIGS. 9A, 9B and 9C illustrate the PES packet syntax inputted to a PES decoder register 24b of the invention; and FIGS. 10A, 10B and 10C illustrate the PSI syntax to be stored in the memory 22a of the invention.

And FIG. 11 illustrates a register list of the transport decoder 21 of the invention; FIG. 12 illustrates a register list of a ADF decoder 23 of the invention; and FIG. 13 illustrates a register list of a PES decoder 24 of the invention.

Additionally, FIG. 14 illustrates a table of interrupt generation in a transport decoder 21 of the invention; FIG. 15 illustrates a table of interrupt generation in a ADF decoder 23 of the invention; FIG. 16 illustrates a table of interrupt generation in a PES decoder 24 according to a preferred embodiment of the invention; and FIG. 17 illustrates a table of interrupt generation in a CPU controlling interface unit 14 of the invention.

First, the transport parser unit 11 storing each syntax field value to the resister after parsing according to the standards of the MPEG2 system, outputting each audio, video and data information which is set of PID after collecting from each packet data inputted from the channel and outputting the interrupt signal if an identified register value of the register values is set of each transport, ADF, PES and PSI decoder. That is the transport decoder 21 of the transport parser unit 11 parses the MPEG2 transport packet syntax as illustrated in FIG. 7 in the transport packet decoder controller 21A and stores the MPEG2 transport packet syntax to the transport packet decoder register 21B as illustrated in FIG. 11. And the field value of the transport packet decoder register 21B generates an interrupt to the CPU 13 according to the state of the interrupt register enable.

An interrupt generating method is that as illustrated in FIG. 14, after the PID field in the transport packet head is compared with the PID in the packet which the user wants, once the compared values are equal with each other, the outcome of the comparison is 1; once the compared values are different with each other, the outcome is 0. In such a manner that it is compared as follows: for the PID-V-flag, the transport PID field is compared with the PID of the video packet and the output that the compared values are same is equal to 1 while that of the different values is equal to 0; for the PID-A-flag, the transport PID field is compared with the PID of the audio packet and the output that the compared values are same is equal to 1 while that of the different values is equal to 0; for the PID-D-flag, the transport PID field is compared with the PID of the data packet and the output that the compared values are same is equal to 1 while that of the different values is equal to 0; for the PID-PAT-flag, the transport PID field is compared with the PID of the program association table PAT and the output that the compared values are same is equal to 1 while that of the different values is equal to 0; for the PID-PMT-flag, the transport PID field is compared with the PID of the program map table PMT and the output that the compared values are same is equal to 1 while that of the different values is equal to 0; for the PID-CAT-flag, the transport PID field is compared with the PID of the conditional access table CAT and the output that the compared values are same is equal to 1 while that of the different values is equal to 0; and for the PID-NIT-flag, the transport PID field is compared with the PID of the network information table NIT and the output that the compared values are same is equal to 1 while that of the different values is equal to 0.

The ADF decoder 23 parses the MPEG2 ADF field syntax as illustrated in FIG. 8 in the ADF decoder controller 23A and stores the MPEG2 ADF field syntax in the ADF decoder register 23B as illustrated in FIG. 12. And the field value of the ADF decoder register 23B generates an interrupt to the CPU 13 according to the state of the interrupt register enable. In this time, the manner of interrupt generation is as shown in FIG. 15.

The PES decoder 24 parses the MPEG2 PES field syntax as illustrated in FIG. 9 in the PES decoder controller 24A and stores the MPEG2 PES field syntax in the PES decoder register 24B as illustrated in FIG. 12. And the field value of the PES decoder register 24B generates an interrupt to the CPU 13 according to the state of the interrupt register enable. The interrupt generating method is illustrated in FIG. 16.

The decoder interface unit 15 of FIG. 3 is as follows:

First, the video decoder interface unit 41 receives an interrupt from the video decoder 5, generates a video interrupt signal Vid-int and transmits the Vid-int through the controlling bus cntrl12 to the CPU controlling interface. The audio decoder interface unit 42 receives an interrupt from the audio decoder 6, generates an audio interrupt signal Aud-int and transmits the Aud-int through the controlling bus cntrl12 to the CPU controlling interface. The data decoder interface unit 43 receives an interrupt from the data decoder 7, generates a data interrupt signal Data-int and transmits the Data-int through the controlling bus cntrl12 to the CPU controlling interface.

An example in which the configuration of the decoder interface unit 15 is as illustrated in FIG. 5 is now described in detail.

The video decoder interface unit 41 receives an address bus signal addr2, a data bus signal data2 and a video decoder selecting signal from the CPU 13 through the selecting signal line, input/outputs the video address, video data and the video controlling signal and has the CPU 13 access the video decoder 5. And the video decoder interface unit 41 receives and stores momentarily a data signal data5 and a controlling signal cntrl5 from the PES decoder 24 and has the video decoder 5 output the video data, the video control and the video address while the CPU 13 does not access the video decoder so that the data bus signal data2 from the CPU 13 is momentarily stored in the first data buffer 51 and the data signal data5 and the controlling signal cntrl5 from the PES decoder 24 is also momentarily stored in the FIFO 52, thereby being outputted through the second data buffer 53. In this time, the FIFO 52 detects if the data is full or empty and outputs the related signals fifo-ef and fifo-ff. The access controlling unit 54 detects if the CPU 13 accesses the video decoder 5 with the received signals fifo-ef and fifo-ff from the FIFO 52 and the controlling signal cntrl2 of CPU 13 and sets the signal token giving right of access to the CPU 13 if the CPU 13 accesses the video decoder. Accordingly, when the signal is changed from 0 to 1, the mode is also changed for the CPU 13 to access the video decoder 5 from the state of transmitting the fifo data to the video decoder 5 so that the interface controller 55 finishes the present accessing job completely and controls the CPU 13 to access the video decoder 5.

When the CPU 13 finishes accessing and after a predetermined period of delaying time, the access of the CPU 13 does not exist and the output signal token from the access controlling unit 54 is reset for 0, the interface controller 55 is operated in the FIFO data transfer mode.

The operation is performed in the same manner in the video decoder interface unit 41, the audio decoder interface unit 42 and the data decoder interface unit 43.

While, the configuration of the decoder interface unit 15 is as illustrated in FIG. 6 in which three FIFO of FIG. 5 are employed as a memory is operated as follows.

First, the video, audio and data decoder interface units 41, 42 and 43 are operated as illustrated in FIG. 5. The memory unit 44 uses a video reading pointer 72 and a video writing pointer 62 in order to access the video data for performing the operation of FIFO, uses an audio reading pointer 73 and an audio writing pointer 63 to access the audio data and uses a data reading pointer 74 and a data writing pointer 64. The video data accessing pointers 72 and 62 increase the reading/writing pointer by 1 point after reading/writing for one time to access the video memory area and are increased by 1 point with returning to the first address after accessing the boundary section of the video memory area. And the audio and data accessing pointers 73, 63, 74 and 64 are also operated in the same manner of the video data accessing pointers.

The value of each pointer 62, 63, 64, 72, 73 and 74 is applied to the memory through each address buffer 65, 66, 67, 69. 70 and 71 and each address buffer 65, 66, 67, 69, 70 and 71 is output-enabled by the memory interface controller 75 and applied to the address port of the memory 68. Therefore, the data data5 outputted from the transport parser unit 11 is applied through the third data buffer 61 to the memory 68 in case of the writing enable and in case of reading, the identified value by each reading pointer 72, 73 and 74 is outputted as a decoder data. The memory interface controller 75 receives and transmits the controlling signal cntrl5 from the transport parser unit 11 and the reading controlling signal vid-mem-cntrl, aud-mem-cntrl and data-mem-cntrl from the video, audio and data decoder interface units 41, 42 and 43, applies the signals to the memory 68 according to the sorts of data identified by the controlling signal cntrl5 among the video, audio and data writing data in order to read the data of the transport parser unit 11 to the memory 68, controls to perform the operation of writing the data data5 to the memory 68, receives the controlling signals vid-mem-cntrl, aud-mem-cntrl and data-mem-cntrl from each decoder interface unit 41, 42 and 43, applies each reading pointer 72, 73 and 74 to the memory 68 while the data is not inputted from the transport parser unit 11, reads the data and outputs the data to each decoder interface units 41, 42 and 43. The operation of CPU interface unit 14 of FIG. 3 provides the register file, an interface between the video, audio decoders and another decoders of the transport parser unit 11 and outputs a selecting signal selecting one among the transport parser unit 11 or the video, audio and data decoders 5, 6 and 7 and the first memory unit 12 by decoding the address. That is, the CPU address decoder 31 decodes a high-address part of the CPU 13 and outputs the selecting signal to select a register of the transport parser unit 11 and a selecting signal to access the program/data memory. And the tp-CPU interface unit 32 decodes the address for each register to have other address by incorporating the controlling signal cntrl1, the address signal addr1 and the selecting signal because that the CPU 13 generates a signal cntrl-dsp-td to access the register on the transport packet decoder register 21B. In another mem-CPU interface unit, 33, adf-CPU interface unit 34 and pes-CPU interface unit 35, as the CPU 13 generates the signals cntrl-dsp-mem, cntrl-dsp-adf and cntrl-dsp-pes to access the corresponding register of the transport parser unit 11 as in the tp-CPU interface unit 32, the controlling signal cntrl1, the address signal addr1 and the selecting signal are incorporated to decode the address for each register to have other address.

Accordingly, the CPU interface unit 14 sets each received interrupt signal tp-int, adf-int, pes-int, vid-int, aud-int and data-int at the point of time at which the interrupt is generated as of FIG. 17. In this time, the interrupt register and the interrupt enable value are capable of being read/written by the CPU 13.

The MPEG2 transport decoder operated as mentioned above is briefly described below.

Once the transport packet is inputted from the channel decoder through the data bus data3 to the transport parser unit 11, the transport packet decoder controller 21A is operated to parse the transport packet header, load each field value of the transport packet header to the corresponding register 21B, 23B and 24B and generates the interrupt to the CPU according to the interrupt enable state. The corresponding controller is operated by detecting if the required packet data is according to the state of PID-V-flag, PID-A-flag, PID-PAT-flag, PID-CAT-flag and PID-NIT-flag after the transport packet header is decoded. In case the ADF field exists in the packet, namely in case the checked bit of the ADF control is 10 or 11, the existing of the ADF field is detected, the ADF decoder controller 23A firstly and the corresponding controllers 22a and 24a are operated. The ADF decoder controller 23a loads each field value of the adf field to the corresponding register by parsing the adf field and generates the interrupt to the CPU 13 according to the interrupt enable condition. In case the ADF field decoding is finished or the ADF field does not exist, the corresponding decoder controller is operated. That is, in case PID-V-flag, PID-A-flag and PID-D-flag are set as 1, the PES decoder controller 24A is operated to parse the PES packet header, load each field value to the corresponding resister and generate the interrupt to the CPU 13 according to the interrupt enable state. And in accordance with the sorts of the video, audio and data decoders, the PES packet data is transmitted to the video decoder interface unit 41, the audio decoder interface unit 42 and the data decoder interface unit 43.

While, the CPU 13 examines which area causes the CPU 13 to generate the interrupt whenever the interrupt exists in each block by loading each interrupt register value and processes the programmed interrupt according to the condition of the interrupt. The CPU 13 can access several registers in the transport parser unit 11 through the CPU interface unit 14 and access the video, audio and data decoders. On the other hand, the decoder interface unit 15 performs as a controller with the video, audio and data decoders as to transmitting the PES packet data decoded from the PES decoder 24 and having the CPU 13 access so that helps the CPU 13 to access each decoders in accordance with the applications after the programmed contents of user.

The above-mentioned MPEG2 transport decoder of the present invention has effects as follows:

First, the decoding operation of the invention may be variously applied according to the programmed contents by user by composing the MPEG2 transport decoder with incorporating a hardwired logic and a CPU capable of being programmed;

Secondly, the application of the present invention is various by incorporating the high- speed hardwired logic with the low-speed CPU;

Thirdly, the present invention solves the problem of developing new transport decoder occurring when the decoder is composed only with the hardwired logic circuit, the application range is limited in the associated application contents and characteristics;

Fourthly, by embodying each decoder interface, the data of the video, audio and data decoded from the hardwired transport parser unit are outputted to the corresponding decoders simultaneously with the CPU may be programmed parses the decode with the time-sharing, thereby accessing the decoder; and Fifthly, while the CPU accesses one of each decoder, the decoder which the CPU does not access can transmits the data stored the memory or the FIFO.

What is claimed is:

1. An MPEG2 transport decoder comprising a channel decoder unit for outputting a signal received through a satellite or a cable by tuning or duplicating to a transport packet data; a transport decoder for decoding the transport packet data; and video, audio and data decoders for decoding the video, audio and data signals by the transport decoder, said transport decoder further comprising:
    a transport parser unit for storing each syntax field value by parsing, outputting each data identified with the packet identifier (PID) after collecting from each packet data and outputting the interrupt signal if a pointed register value of register values is set;
    a CPU interface unit for providing an interface between the resister file of said transport parser unit and each decoder and outputting a signal selecting a transport parser unit or a video decoder, an audio decoder, a data decoder and a memory by decoding the address;
    a CPU for reading the interrupt register from said CPU interface unit once an interrupt signal is inputted, detecting if the interrupt signal is inputted from said transport parser unit or from the video decoder, the audio decoder and the data decoder, and decoding according to the program on a memory unit;
    a memory unit for storing a program of the operations of said CPU; and
    a decoder interface unit for controlling in order to exchange the data among said CPU, said transport parser unit and said video, audio, data decoders.

2. An MPEG2 transport decoder as defined in claim 1, wherein said transport parser unit comprises:
    a channel decoder interface unit for inputting/outputting the data and controlling signal with said channel decoder unit;
    a transport decoder for storing each field value of each parsed header by parsing said MPEG2 transport packet syntax and interrupting the parsed field value to said CPU according to the condition of the interrupt register enable;
    a memory unit for storing program specific information (PSI) sections of the MPEG2 streams, adaptation_extension_data, transport_private_data, pes_extension_data and digital storage media (DSM)_trick_mode_data at addresses of the memory designated by the CPU;
    an adaptation field (ADF) decoder for storing each field value of each parsed header by parsing the ADF data of said MPEG2 transport packet syntaxes and interrupting the parsed field value to said CPU according to the condition of the interrupt register enable; and
    a packetized elementary stream (PES) decoder for storing each field value of each parsed header by parsing the PES section of said MPEG2 streams and interrupting the parsed field value to said CPU according to the condition of the interrupt register enable.

3. An MPEG2 transport decoder as defined in claim 2, wherein said transport decoder further comprises:
    a transport packet decoder controller for parsing the MPEG2 transport packet syntax; and
    a transport packet decoder register for storing each header field value parsed in said transport packet decoder controller and the registers in said transport decoder register are accessed by said CPU.

4. An MPEG2 transport decoder as defined in claim 2, wherein said memory unit comprises:
    a memory for storing the PSI sections of the MPEG2 streams and the adaptation_extension_data, the transport_private_data, the PES_extension_data, and the $DSM\_trick\_mode_{13}$ data contained in the selected packet, and a memory controller having start addresses and end addresses for storing each PSI data, the adaptation_extension_data, the transport_private_data, the PES_extension_data and the $DSM\_trick\_mode_{13}$ data at designated addresses in the memory and for generating write addresses with automatic change of the write address starting from the start addresses to the end addresses for storing data, whereby the memory receives data and a control signal for storing the received data from the memory controller and allows the CPU access to the received data.

5. An MPEG2 transport decoder as defined in claim 2, wherein said ADF decoder comprises:
    an ADF decoder controller for parsing the ADF data of said MPEG2 transport packet syntaxes; and
    an ADF decoder register for storing each field value of the parsed header in said ADF decoder controller and the registers in said ADF decoder registers are accessed by CPU.

6. An MPEG2 transport decoder as defined in claim 2, wherein said PES decoder comprises:
    a PES decoder controller for parsing the PES section of said MPEG2 streams; and
    a PES decoder register for storing each field value of the parsed header and the registers in said PES decoder registers are accessed by CPU.

7. An MPEG2 transport decoder as defined in claim 1, wherein said CPU interface unit comprises:
    a data buffer for performing a buffering to read/write the contents of said CPU data bus;
    a CPU address decoder for generating a selecting signal for selecting a register of said transport parser unit by decoding the high address part of said CPU, a selecting signal for accessing the video, audio and other decoders and a selecting signal for accessing the program/data memory;
    a transport (tp)-CPU interface unit for generating a controlling signal cntrl-dsp-td for said CPU to access the register in the transport packet decoder register by incorporating a controlling signal of the CPU with the address signal and the selecting signal;
    a memory interface unit for generating a controlling signal cntrl-dsp-mem for the CPU to access the register in the memory controller by incorporating a controlling signal of the CPU with an address signal and a selecting signal;

an adf-CPU interface unit for generating a controlling signal cntrl-dsp-adf for the CPU to access the register in the ADF decoder register by incorporating a controlling signal of the CPU with an address signal and a selecting signal; and a pes-CPU interface unit for generating a controlling signal cntrl-dsp-pes for the CPU to access the register in the PES decoder register by incorporating a controlling signal of the CPU with an address signal and a selecting signal.

8. An MPEG2 transport decoder as defined in claim 7, wherein said tp-CPU interface unit, memory interface unit and adf-CPU interface unit decode each address for each register to have other address.

9. An MPEG2 transport decoder as defined in claim 1, wherein said decoder interface unit comprises:

a video decoder interface unit for controlling a controlling signal for the CPU and the PES decoder to access the video decoder jointly;

an audio decoder interface unit for controlling a controlling signal for the CPU and the PES decoder to access the audio decoder jointly; and a data decoder interface unit for controlling a controlling signal for the CPU and the PES decoder to access the data decoder jointly.

10. An MPEG2 transport decoder as defined in claim 9, wherein said video, audio and data decoder interface units comprise:

a first data buffer for outputting after storing momentarily the outputted data;

a memory unit for storing the data outputted from said transport parser unit and then outputting firstly the data inputted before, simultaneously with outputting the signals fifo-ef and fifo-ff indicating if the data is filled out or not;

a second data buffer for outputting the data outputted from said memory unit after storing momentarily;

an access controlling unit for setting the signal token giving right of an access to said CPU according to the decoder accessing condition of the CPU and the outputting signals fifo-ef and fifo-ff from said memory unit; and an interface controlling unit for controlling said CPU access to read/write the video decoder after finishing the present accessing job with receiving the signal token from said access controlling unit.

11. An MPEG2 transport decoder as defined in claim 9, wherein said video, audio and data decoder interface units can be partially composed in accordance with the application.

12. An MPEG2 transport decoder as defined in claims 9 or 10, wherein said video, audio and data decoder interface units are organized with sharing the memory unit.

13. An MPEG2 transport decoder as defined in claim 12, wherein said memory unit comprises:

a third data buffer for storing the output data of said transport parser unit momentarily;

a memory being divided into three areas of video, audio and data storing areas and storing the data inputted from said third data buffer or outputting the stored data as the decoder data;

a video writing pointer for outputting a writing address in order to write the video data to said memory;

an audio writing pointer for outputting a writing address in order to write the audio data to said memory;

a data writing pointer for outputting a writing address in order to write the data to said memory;

a first address buffer for storing momentarily the address outputted from said video writing pointer;

a second address buffer for storing momentarily the address outputted from said audio writing pointer;

a third address buffer for storing momentarily the address outputted from said data writing pointer;

a video reading pointer for outputting a reading address in order to read the video data to said memory;

an audio reading pointer for outputting a reading address in order to read the audio data to said memory;

a data reading pointer for outputting a reading address in order to read the data to said memory;

a fourth address buffer for storing momentarily the address outputted from said video reading pointer;

a fifth address buffer for storing momentarily the address outputted from said audio reading pointer;

a sixth address buffer for storing momentarily the address outputted from said data reading pointer; and a memory interface controller for controlling the operations of said video, audio and data reading/writing pointers and said first to sixth address buffers by the controlling signal cntrl5 from the PES decoder.

14. An MPEG2 transport decoder including a channel decoder unit for outputting a signal received through a satellite or a cable by tuning or duplicating to transport packet data; a transport decoder for decoding the transport packet data; and video, audio and data decoders for decoding video, audio and data signals by the transport decoder, said transport decoder further comprising:

transport parser means for storing each syntax field value by parsing, outputting each data identified with the packet identifier (PID) after collecting from each packet data and outputting the interrupt signal if a pointed register value of register values is set;

CPU interface means for providing an interface between a register file of said transport parser means and each of said video, audio and data decoders;

CPU means for reading an interrupt register from said CPU interface means once an interrupt signal is inputted;

said memory means for storing a program of the operations of said CPU means; and decoder interface means for controlling the exchanging of data among said CPU means, said transport parser means and said video, audio, and data decoders.

15. The MPEG2 transport decoder according to claim 14, wherein the CPU interface means further comprises:

an output for outputting a signal selecting said transport parser means or one of said video, audio, and data decoders and said memory means by decoding the address.

16. The MPEG2 transport decoder according to claim 15, wherein the CPU means further comprises:

a detector portion for detecting if the interrupt signal is inputted from said transport parser means or from one of the video, audio, and the data decoders, and a decoder portion for decoding according to the program on said memory means.

17. An MPEG2 transport decoder comprising:

first means for storing a program, reading an interrupt register, detecting a portion of the transport decoder providing an interrupt signal to said first means, and performing a decoding operation in accordance with the program;

second means for parsing an MPEG2 transport packet syntax and controlling an address bus, a data bus and a controlling signal for said first means; and interface means for providing an interface between said first means and said second means.

* * * * *